March 19, 1957 L. M. HOUGH 2,785,805
OIL FILTERS
Filed June 12, 1953 3 Sheets-Sheet 1
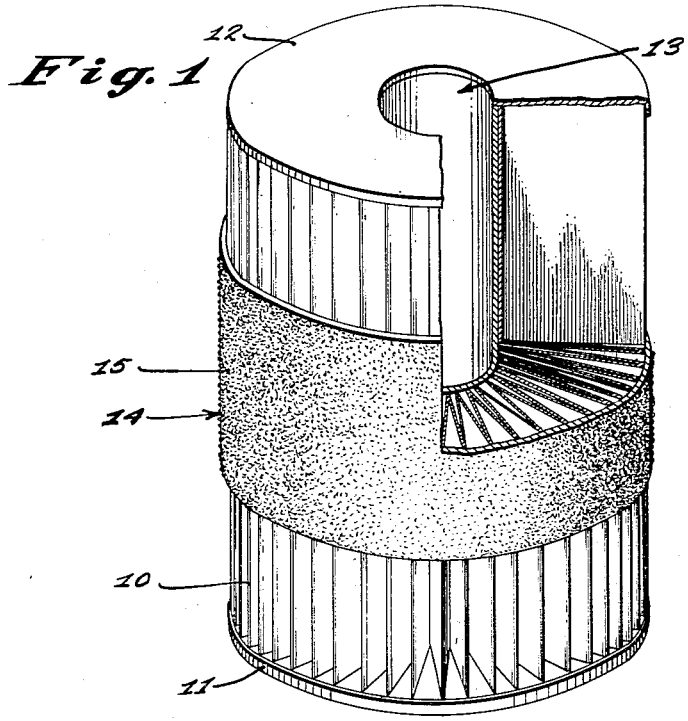
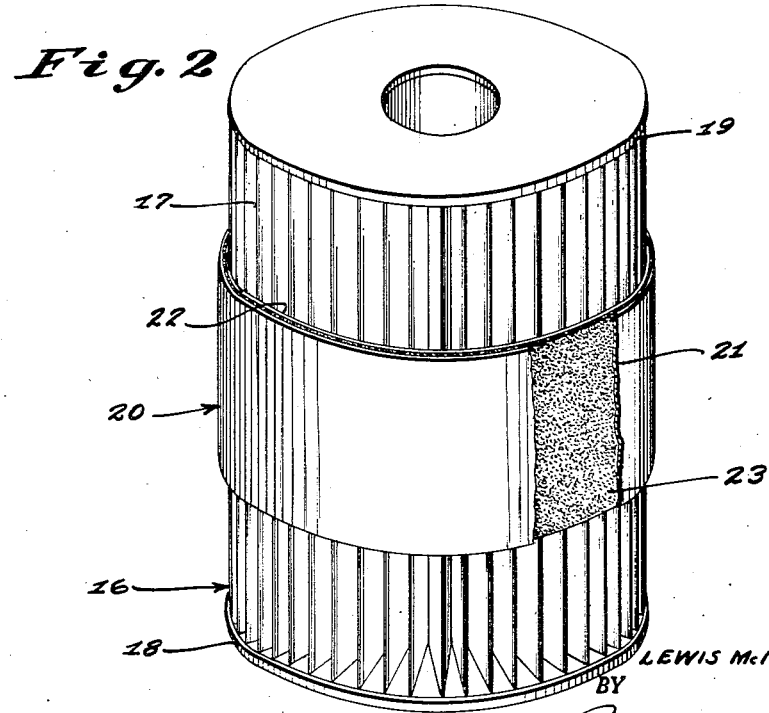
INVENTOR.
LEWIS McNEIL HOUGH
BY
Parrott & Richards
ATTORNEYS March 19, 1957  L. M. HOUGH  2,785,805
OIL FILTERS
Filed June 12, 1953  3 Sheets-Sheet 2

INVENTOR.
LEWIS McNEIL HOUGH
BY
Parrott & Richards
ATTORNEYS

March 19, 1957  L. M. HOUGH  2,785,805
OIL FILTERS

Filed June 12, 1953  3 Sheets-Sheet 3

INVENTOR.
LEWIS McNEIL HOUGH
BY
*Parrott & Richards*
ATTORNEYS

United States Patent Office 2,785,805
Patented Mar. 19, 1957

2,785,805

OIL FILTERS

Lewis M. Hough, Gastonia, N. C., assignor to Wix Corporation, a corporation of North Carolina Application June 12, 1953, Serial No. 361,207

3 Claims. (Cl. 210—169)

This invention relates to oil filters and more particularly to improvements in the so-called "surface" type of oil filter removable cartridge, comprising a fluted paper cylinder through which the oil passes the effect removal of dirt, metal or other foreign material, and having an annular center bore through which the filtered oil is returned to the internal combustion engine.

In accordance with the present invention, the surface type of oil filter paper cartridge is supplied with a suitable deposit of a material that functions to eliminate the corrosive said constituent of the oil that passes through the filter. This acid removing material is of a water insoluble, oil insoluble, solid, granular type, and I have obtained excellent results with the two types of anion exchange resins disclosed in my copending applications, Serial No. 361,409, filed June 12, 1953, and Serial No. 361,410, filed June 12, 1953, when used in or upon the oil filter cartridge in accordance with the present invention. The anion exchange resin of the type disclosed in said application, Serial No. 361,409, filed June 12, 1953, comprises reaction products of a primary amine or a secondary amine or mixtures of the two types of amines and an insoluble, cross-linked copolymer of an aromatic monovinyl hydrocarbon and an aromatic divinyl hydrocarbon, which copolymer contains haloalkyl groups having the formula —$C_nH_{2n}X$, wherein X is a chlorine or bromine atom and —$C_nH_{2n}$— is an alkylene group in which $n$ is an integer of a value from one to four.

The anion exchange resin material disclosed in my application, Serial No. 361,410, filed June 12, 1953, comprises a reaction product of a polyalkylene polyamine, an aldehyde and a nitroalkane containing at least two labile hydrogen atoms capable of reacting with formaldehyde to form methylol compounds.

In accordance with the present invention, the anion exchange resin is deposited in a suitable manner in or upon the replaceable paper cartridge portion of the oil filter. This cartridge comprises usually a cylindrical shaped member formed from fluted, oil permeable paper, through which the oil passes, and is conducted back to the supply through a longitudinal center bore in the paper cartridge. An example of this type of oil filter and paper filter cartridge component is disclosed in J. D. Wicks Patent No. 2,627,350, issued February 3, 1953 and assigned to the same assignee as the present application. Reference to that patent may be had for any desired details of oil filter construction, although the present invention is concerned principally with the filter cartridge component, which is formed of fluted paper and examples of which are illustrated in the accompanying drawings in conjunction with representative but non-limiting forms of suitable means for applying the acid removing material to the filter cartridge.

Referring to the drawings:

Fig. 1 is a perspective view of a suitable type of filter cartridge having the acid removing material carried on a single thickness band which encircles the cartridge;

Fig. 2 is a perspective view and the same as Fig. 1 except that the acid removing material is sandwiched between two porous paper sheets which form an encircling band around the filter cartridge.

Figure 3:
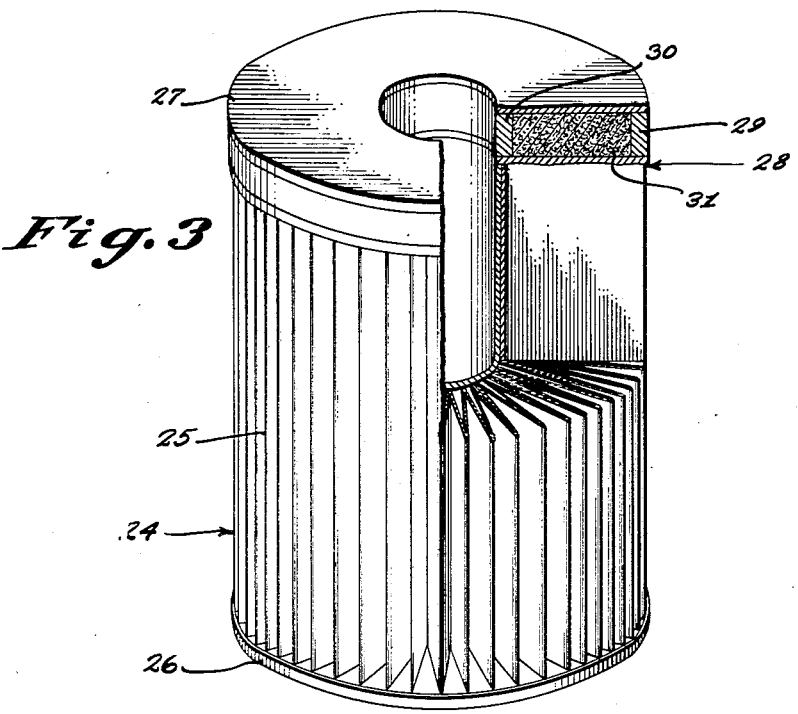
Fig. 3 is a similar perspective view, except that the acid removing material is contained in loose form in a porous annular compartment located at one end of the filter cartridge.

Referring now to the several figures and generally in the order in which they occur, the filter cartridge shown in Fig. 1 is composed of a filter member formed from a strip of fluted, oil permeable, semi-stiff paper 10. This filter member 10 contains paper end caps 11 and 12 which, together with the member 10, have a center longitudinal bore, indicated at 13.

Encircling the filter member 10 is a strip or band of paper or other suitable material 14, and deposited on this strip 14 is the acid removing material 15. This material will be in the form of a coating or deposit of water insoluble, oil insoluble solid particles and may be one of the anion exchange resin materials disclosed in my above identified copending patent applications. The material disclosed in said application, Serial No. 361,409, filed June 12, 1953, is normally in the form of small spheres or beads, whereas the material disclosed in the other application, Serial No. 361,410, filed June 12, 1953, is usually in a granular form or broken solid particles of irregular shape.

These or other suitable types of acid removing material may be deposited on the band 14 by suitable procedures which will vary with the physical characteristics of the acid removing material. For the above mentioned bead or granular forms of material, it is preferable to deposit them on the band 14 by means of a water insoluble, oil insoluble resin, such as a phenol formaldehyde, urea formaldehyde or melamine type of resin, but it is to be understood that the present invention is not limited to any particular form of resin, for various other resins including polyvinyl acetate, for example, which are insoluble and inert to the oil at the operating temperatures of around 180° F. may be employed.

The band 14 shown in Fig. 1 may be either of a porous or non-porous material as desired. An illustrative example of a suitable material is semi-rigid, heavy kraft paper, which would be coated on the exterior surface with one of the above mentioned bonding adhesive suitable for holding the anion exchange resin or other acid removing material. This band 14 may be bonded to the fluted paper filter element 10 if desired, although in the usual case this is not necessary as a simple friction fit between the band 14 and the element 10 is satisfactory.

In operation of the oil filter, the circulating oil comes in contact with the deposit 15 of the oil insoluble acid removing material which reacts with the acid constituent of the oil and converts it into salts of a non-corrosive character. As the salts are formed from the anion exchange material and acid, they are not free to flow with the oil and are thereby rendered harmless.

Referring to Fig. 2, the filter cartridge 16 shown therein is composed of the fluted paper 17, has end caps 18 and 19, and encircling band 20. Except for the band 20, these elements are substantially the same as those shown in Fig. 1. The band 20, however, is composed of two relatively thin porous sheets of paper, indicated at 21 and 22, somewhat similar to a tea bag structure, and which contains between the two porous sheets of paper, a deposit of the acid removing material 23.

In this form of filter cartridge shown in Fig. 2, the oil will penetrate through both of the paper layers 21 and 22 of the band 20 and will pass through and come in physical contact with the acid removing material 23, which is contained therein in discrete solid particle form, and which functions to eliminate the acid constituent of the oil as above described.

In Fig. 3 the filter cartridge 24 contains a fluted paper member 25 and end caps 26 and 27 in substantially the same form as in Fig. 1. The arrangement illustrated in this figure for carrying the acid removing material comprises a ring shaped member 28, which has porous walls 29 and 30, and which contains therebetween a deposit of the acid removing material 31. This material 31, in loose discrete particle form, functions to remove the acid constituent from the oil that circulates therethrough, by neutralizing the acid constituent to form salts, as above described.

Figure 4:
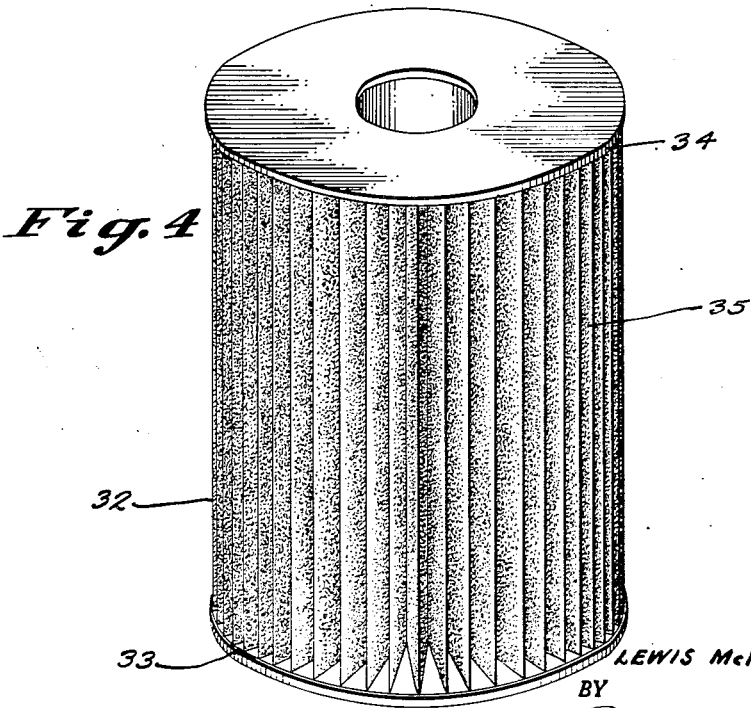
Fig. 4 is a perspective view of a filter cartridge, like that shown in Fig. 1 except that the acid removing material is deposited directly upon the fluted filter paper.

Fig. 4 illustrates the same type of filter shown in Fig. 1 and having a fluted filter element 32 held together by end caps 33 and 34. In this arrangement, the acid removing material 35 is not carried by a separate or added member, but is deposited directly upon the fluted porous paper filter element 32. This may be accomplished as described above in connection with Fig. 1 by first applying to the fluted element 32, a coating of a suitable oil insoluble adhesive material, such as one of the synthetic resin adhesives mentioned above, after which the solid discrete particle acid removing material may be sprinkled or dusted on to the coating of tacky adhesive, and upon drying of the adhesive, will be firmly bonded to the filter element 32.

Figure 5:
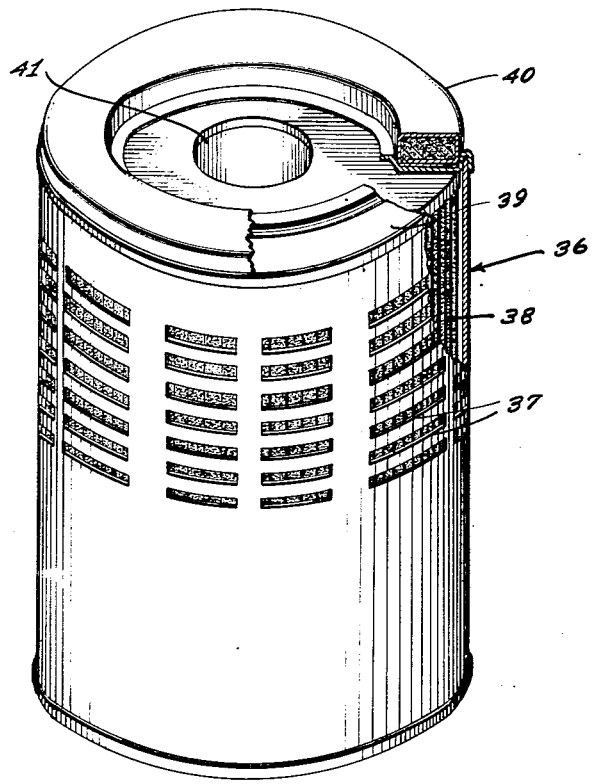
Fig. 5 is a perspective view showing the fluted filter paper cartridge enclosed in the usual perforated metal can and having a separated porous container of the anion exchange resin placed on top of the can.

Referring to Fig. 5 of the drawings, it will be noted that it consists of the same elements as Fig. 4, and in addition, contains a metal can or housing 36, which has perforations 37 to permit ingress of the oil and filtering thereof by means of the perforated filter paper cartridge 38. This metal can 36 has a channel shaped top cap 39, and seated upon this channel shaped member is a ring shaped container 40 of the anion exchange resin material. This container may be composed of porous paper, perforated plastic, or other suitable form of oil permeable material, such that the oil may flow into the container, make contact with the anion exchange resin material therein, then flow through the perforations 37, through the filtering media 38, and into the center bore 41 for egress of the filtered oil.

Various other arrangements, materials and procedures contemplated within the scope of the present invention are indicated in the appended claims.

I claim:

1. In an oil filter for use in an internal combustion engine, a cartridge comprising a fluted, oil permeable paper filter element, through which the oil passes, and an encircling band of paper having over its entire surface a fixed deposit of an oil insoluble, solid, discrete particle form of acid removing material that neutralizes the acid in the oil that flows through said fluted, permeable element and comes in contact with the acid removing material.

2. In an oil filter for use in an internal combustion engine, a cartridge comprising a fluted, oil permeable paper filter element, through which the oil passes, and an encircling band, in the form of a single thickness strip of paper, having a fixed deposit thereon of an oil insoluble solid, discrete, particle form of acid removing material that neutralizes the acid in the oil that flows through said fluted, permeable element, and comes in contact with the acid removing material, said acid removing material being bonded to the outer surface of said strip of paper.

3. In an oil filter for use in an internal combustion engine, a cartridge comprising a fluted, oil permeable paper filter element, through which the oil passes, and an encircling band, in the form of a plurality of relatively thin porous paper sheets which form a container, and a quantity of oil insoluble, discrete, solid particles of acid removing material that neutralizes the acid in the oil that flows through said fluted, permeable element and comes in contact with the acid removing material.

References Cited in the file of this patent

UNITED STATES PATENTS

| | | |
|---|---|---|
| 1,548,160 | Newman | Aug. 4, 1925 |
| 2,057,414 | Briggs | Oct. 13, 1936 |
| 2,093,430 | Franklin et al. | Sept. 21, 1937 |
| 2,093,877 | Von Pentz | Sept. 21, 1937 |
| 2,148,708 | Orr | Feb. 28, 1939 |
| 2,239,868 | Williams | Apr. 29, 1941 |
| 2,304,637 | Hardy | Dec. 8, 1942 |
| 2,395,449 | Briggs | Feb. 26, 1946 |
| 2,456,428 | Parker | Dec. 14, 1948 |
| 2,534,907 | Ham et al. | Dec. 19, 1950 |
| 2,566,353 | Mills | Sept. 4, 1951 |
| 2,591,574 | McBurney | Apr. 1, 1952 |